UNITED STATES PATENT OFFICE.

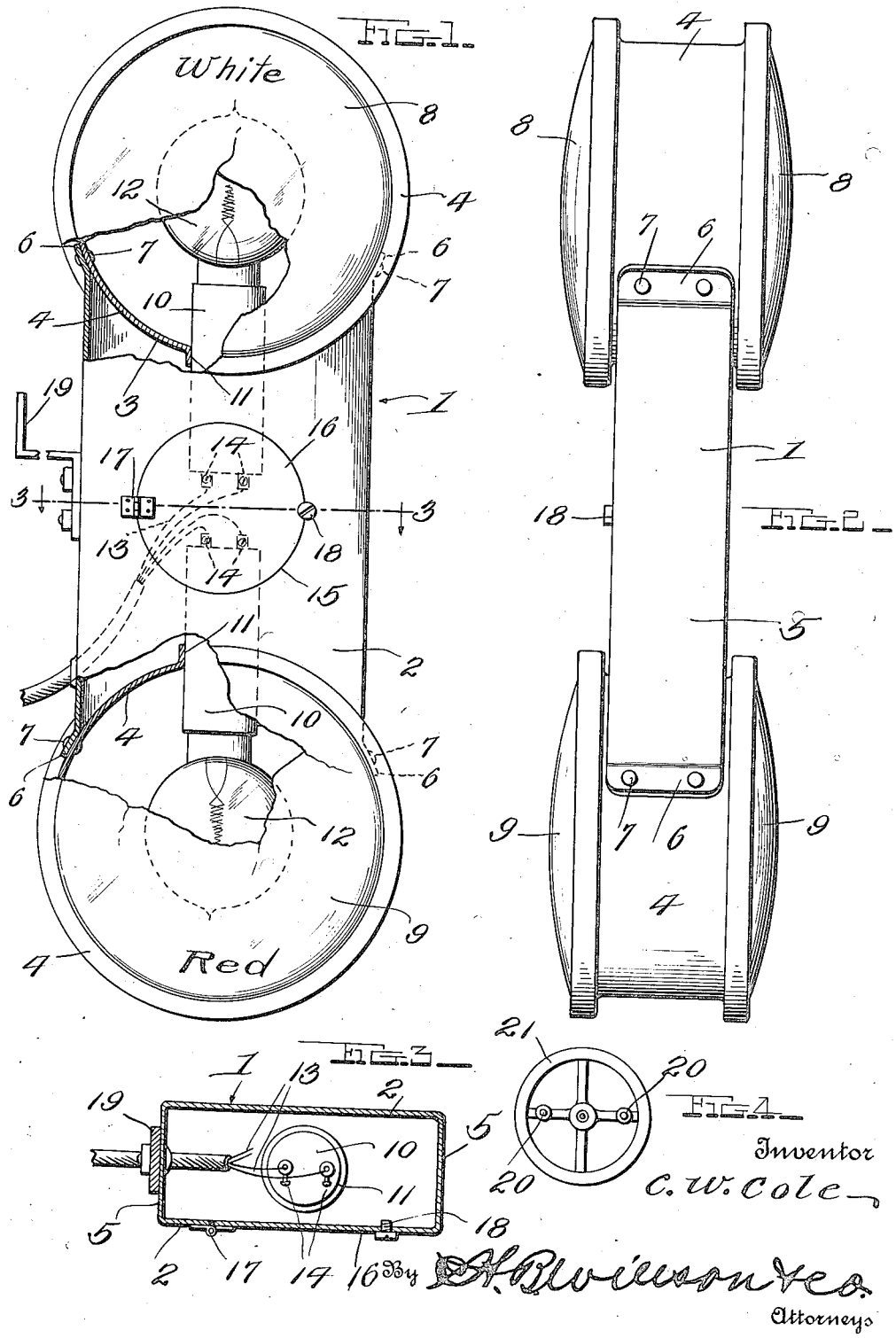

CLEVELAND W. COLE, OF SPOKANE, WASHINGTON, ASSIGNOR TO COLE DUPLEX AUTO SIGNAL COMPANY, OF SPOKANE, WASHINGTON, A CORPORATION.

AUTOMOBILE-SIGNAL.

1,310,410.　　　　　　Specification of Letters Patent.　　Patented July 22, 1919.

Application filed February 3, 1919. Serial No. 274,699.

*To all whom it may concern:*

Be it known that I, CLEVELAND W. COLE, a citizen of the United States, residing at Spokane, in the county of Spokane and State of Washington, have invented certain new and useful Improvements in Automobile-Signals; and I do declare the following to be a full, clear, and exact description of the invention, such as will enable others skilled in the art to which it appertains to make and use the same.

My invention has for its object to provide an extremely simple and inexpensive, yet a highly efficient and easily operated signal for automobiles and other vehicles, for signaling either danger or safety to other vehicles and to pedestrians.

With the foregoing in view, the invention resides in the novel construction and arrangement of parts hereinafter fully described and claimed, and shown in the accompanying drawing.

Figure 1 is a side elevation of the device.

Fig. 2 is an edge view.

Fig. 3 is a transverse section on the plane of the line 3—3 of Fig. 1.

Fig. 4 is a plan view of an automobile steering wheel showing the arrangement of push buttons which may be employed for operating the device.

In the drawing above briefly described, the numeral 1 designates a substantially flat casing by preference elongated in a vertical direction although in some instances it might be disposed horizontally. At the ends of the casing, the opposite side walls 2 of the latter are cut transversely on arcuate lines to form seats 3 for a pair of lamp casings 4 of cylindrical formation, the curved walls of said lamp casings resting snugly in the seats 3 as illustrated in Fig. 1. Although any preferred means might be employed for securing the casings 1 and 4 together, the edge walls 5 of the former are by preference provided with flanges 6 coincident with the curved ends or seats 3 of the side walls 2, said flanges being secured by rivets or the like 7 to the casings 4. Both ends of one casing 4 are closed by lenses 8 of white glass, while the ends of the other casing are provided with red lenses 9.

Lamp sockets 10 such as those commonly used on automobiles, are secured in openings 11 formed in the curved walls of the lamp casings 4 and extend from the interior of these casings into the casing 1, as clearly shown in Fig. 1. Electric bulbs 12 are removably received in the sockets 10 and have the usual electric connection therewith, said bulbs being located in the casings 4 so that when one is lighted a white light will be displayed through the lenses 8, whereas lighting of the other bulb will display a red light, due to the red lenses 9. Both the white and red lights are visible from both front and rear ends of the machine and thus pedestrians and the drivers of other vehicles may readily see when either danger or safety prevails.

Wires 13 leading to the sockets 10 are connected to said sockets in any preferred manner at 14, and all of these connections are accessible through an opening 15 in one side of the casing when the door 16 normally closing said opening, is opened. The door 16 is hinged at 17 and by any suitable means such as a screw 18, said door may be held normally closed.

The entire device may be mounted on the vehicle in any preferred manner, as by the use of a bracket 19 and the current for the bulbs 12 may be controlled by suitable switches or push buttons 20. When the device is used on automobiles, the push buttons 20 are preferably mounted on the steering wheel 21 as indicated in Fig. 4, but they could well be otherwise located.

From the foregoing, taken in connection with the accompanying drawing, it will be seen that the device is of such nature as to permit easy manufacture and sale at small cost, yet that the invention will be highly efficient and desirable. Since probably the best results are obtained from the details disclosed, such details may well be followed, but I wish it understood that within the scope of the invention as claimed, numerous minor changes may well be made and that the device may be used wherever applicable, attached in any suitable manner, and operated by any adequate means.

I claim:

1. An automobile signal comprising an elongated casing having its opposed side walls formed on arcuate transverse lines at their ends to provide seats, a pair of lamp casings, whose side walls rest in and are secured in said seats, said lamp casings having lenses at both their front and rear sides and the lenses of the two casings being of different colors; said side walls of the lamp casings spanning the ends of said elongated casing and having openings, lamp sockets mounted in said openings and extending partly into said lamp casings and partly into said elongated casing, said sockets having wire connecting terminals located in said elongated casing, and a door into this casing for giving access to said terminals.

2. An automobile signal comprising an elongated casing having flat side and edge walls, said side walls being formed on arcuate transverse lines at their ends to provide seats, and the ends of said edge walls extending outwardly coincident with said seats to provide attaching flanges, a pair of annular lamp casing walls resting in said seats and secured to said flanges, lenses coöperating with said annular walls to form a pair of lamp casings; both the front and rear sides of said lamp casings having lenses, and the lenses of one casing being of different color from those of the other; said casing walls spanning the ends of said elongated casings and having openings, lamp sockets mounted in said openings and extending partly into said lamp casings and partly into said elongated casing, said sockets having wire connecting terminals located in said elongated casing, and a door into this casing for giving access to said terminals.

3. The combination in an automobile signal, of an upright, open end, intermediate, casing having a door and fashioned with upper and lower end seats, a pair of fixed lamp casings each having its side wall in a seat, and each lamp casing provided with a front and a rear lens and the lenses of the upper and lower casings differing in color, lamps in the end casings, supported in said side walls and provided with connecting terminals in the intermediate casing.

In testimony whereof I have hereunto set my hand.

CLEVELAND W. COLE.